J. FLAMMANG.
PISTON RING.
APPLICATION FILED OCT. 17, 1914.
1,165,085.  
Patented Dec. 21, 1915.
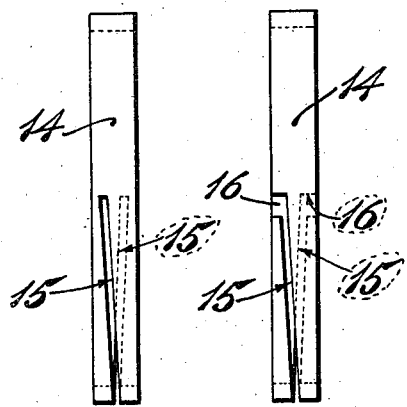
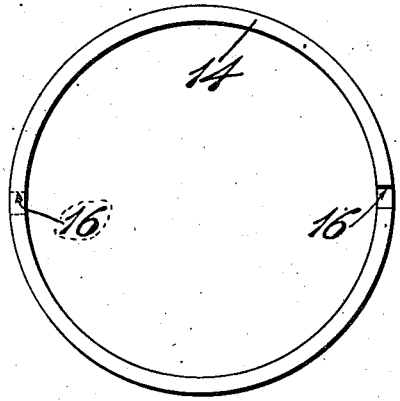
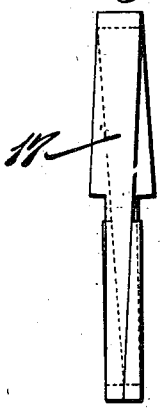
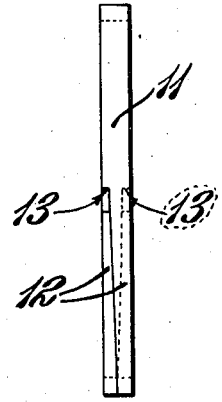
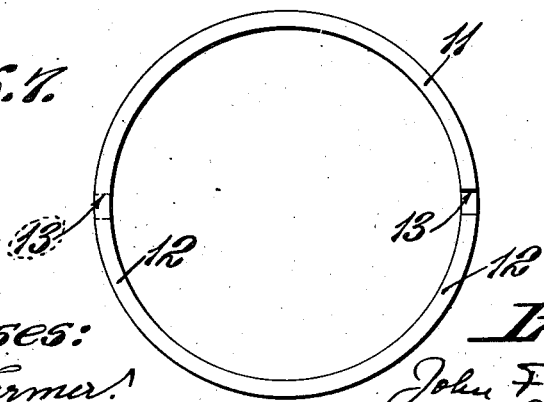
Witnesses:  
Edgar T. Farmer  
A. M. Holcombe
Inventor:  
John F. Flammang,  
by Cavert & Cavert  
his Attys.

UNITED STATES PATENT OFFICE.

JOHN FLAMMANG, OF ST. LOUIS, MISSOURI, ASSIGNOR TO INLAND MACHINE WORKS, OF ST. LOUIS, MISSOURI, A CORPORATION OF MISSOURI.

PISTON-RING.

1,165,085.  Specification of Letters Patent.  Patented Dec. 21, 1915.

Application filed October 17, 1914. Serial No. 867,051.

*To all whom it may concern:*

Be it known that I, JOHN FLAMMANG, a citizen of the United States, and a resident of the city of St. Louis and State of Missouri, have invented new and useful Improvements in Piston-Rings, of which the following is a specification.

This invention relates to flexible metallic rings for packing the pistons of reciprocating engines, and consists in a split ring having its overlapping ends tapered off and lapped for about one half its circumference.

The invention also consists in a piston ring characterized by the process of manufacture hereinafter described.

Further details of the invention appear from the following description of the piston ring shown in the accompanying drawings, and the process of making the same.

In the drawings, in which like characters designate the same parts in the several views, Figure 1 is a side view of a partly formed piston ring, showing its form after the first cutting operation; Fig. 2 is a view similar to Fig. 1 of the same after the second cutting operation; Fig. 3 is a face view of the partly finished ring shown in Fig. 2; Fig. 4 is a side view of the same showing it after being inverted or reversed with respect to the relative position of the overlapping tapered ends; Fig. 5 is a side view of the same after reinversion; Fig. 6 is a side view of the same after the faces of the ring have been finished; and Fig. 7 is a face view of the finished ring.

The finished piston ring, shown in Figs. 6 and 7, consists of a circularly formed strip of cast iron or steel 11 having its ends notched and tapered off, the tapered portions 12 being lapped for about one half of the circumference of the ring, and each terminating a short distance from the notch 13 in the other end of the strip. The length of the tapered portions 12 and relative location of the notches 13 with respect thereto is such that when the ring is compressed into a cylinder of the size for which it is intended, each extremity of the ring will almost touch the transverse wall of the notch, leaving but a very narrow space between the two. Hence, any gas which may find its way between the end of the ring and the notch into the groove in the piston will have to travel one half way around the groove to the opposite end of the ring and between the end of the ring and the opposite notch before it can escape past the ring. The lapped ends of the ring are in close contact throughout, and are maintained in this position by the resiliency of the metal, which is so disposed that it tends to spring them together.

The process of constructing the piston ring, as shown in the drawings, consists in cutting a spiral slot 15 in a suitable metal hoop or ring 14 from a point near one edge of the ring to a diametrically opposite point near the opposite edge thereof. The next operation is to cut notches 16 through the edges of the ring opposite the ends of the spiral slot. The solid ring 14 is thus split into a ring shaped strip of metal having overlapping tapered ends which are spaced apart the width of the slot 15. The next operation is inverting the split ring 14, that is, reversing the relative positions of the ends by passing one by the other, as shown in Fig. 4. The inverted ring 17 thus produced is heated or hammered until the disturbance of its molecular structure, due to the distortion of its shape from its original form, is entirely corrected by the rearrangement of the molecules in equilibrium and in conformity with the new shape. Reinversion of the ring 17 to position its ends on the same relative sides or faces as originally produces strains in the metal which cause the ends of the ring to bear snugly against its sides, forming a tight joint from end to end of the overlapping portions. The closed ring 18 thereby produced needs only to be faced off on its end faces and ground on its periphery to give it the form of the finished piston ring 11. The facing off and grinding may be done in the usual way, the ring being held in a fixture so that its diameter is approximately that of the cylinder for which it is intended.

The order of the initial cutting operations is not important, nor is that of the final finishing operations.

It is evident that changes in the form and proportions of the device may be made to suit different conditions. The invention is not restricted to the precise form and proportions of the ring shown, nor to a ring made by the above described process of manufacture. No claim for the process of manufacture is made in this application.

I claim the following as my invention:

1. A split piston ring having its ends overlapping for about one half of its circumference and sprung together, the overlapping portions being pressed together by the resiliency of the metal.

2. A piston ring having its opposite sides notched at diametrically opposite points, and its half circumference split on a spiral curve intersecting said notches, thereby forming tapered ends overlapping for about one half of its circumference, said split ring being twisted between its extremities to cause said ends to spring together.

3. A split piston ring having its opposite sides notched at diametrically opposite joints, and its ends overlapping for about one half of its circumference and sprung together, the width of the overlapping ends gradually increasing from their extremities to the notches.

4. A metal piston ring having one half of its circumference split on a spiral curve and impressed with internal strains whereby the overlapping portions thereof are pressed together by the resiliency of the metal.

5. A metal piston ring having a substantial portion of its circumference split on a spiral curve and impressed with internal strains whereby the overlapping portions thereof are pressed together throughout their length by the resiliency of the metal.

6. A split piston ring having its ends lapped lengthwise, said lapped ends being held together sidewise throughout their length by the resiliency of the metal.

7. A split piston ring having its ends tapered and lapped lengthwise, said lapped ends being held together sidewise throughout their length by the resiliency of the metal.

Signed at St. Louis, Missouri, this 15th day of October, 1914.

JOHN FLAMMANG.

Witnesses:
A. M. HOLCOMBE,
MARTHA A. SHELTON.